US 8,204,198 B2

(12) United States Patent
Adeney

(10) Patent No.: US 8,204,198 B2
(45) Date of Patent: Jun. 19, 2012

(54) METHOD AND APPARATUS FOR SELECTING AN AUDIO STREAM

(75) Inventor: Kathryn Adeney, Dunrobin (CA)

(73) Assignee: Magor Communications Corporation, Ottawa, ON (CA)

( * ) Notice: Subject to any disclaimer, the term of this patent is extended or adjusted under 35 U.S.C. 154(b) by 601 days.

(21) Appl. No.: 12/488,114

(22) Filed: Jun. 19, 2009

(65) Prior Publication Data

US 2010/0324890 A1 Dec. 23, 2010

(51) Int. Cl.
*H04M 9/10* (2006.01)
(52) U.S. Cl. .............. 379/202.01; 704/200; 704/201
(58) Field of Classification Search .......... 704/200, 704/201; 379/202.01
See application file for complete search history.

(56) References Cited

U.S. PATENT DOCUMENTS

| 7,130,797 | B2 | 10/2006 | Beaucoup et al. |
| 2002/0001389 | A1 | 1/2002 | Amiri et al. |
| 2003/0158900 | A1* | 8/2003 | Santos ............... 709/205 |
| 2005/0094795 | A1* | 5/2005 | Rambo ............... 379/202.01 |
| 2009/0220065 | A1* | 9/2009 | Ahuja et al. ......... 379/202.01 |
| 2009/0253418 | A1* | 10/2009 | Makinen .............. 455/416 |

OTHER PUBLICATIONS

"On Microphone-Array Beamforming From a MIMO Acoustic Signal Processing Perspective", Jacob Benesty, IEEE Transactions on Audio, Speech, and Language Processing, vol. 15, No. 3, Mar. 2007, pp. 1053-1065.
"Design of Broadband Beamformers Robust Against Gain and Phase Errors in the Microphone Array Characteristics", Simon Doclo et al., IEEE Transactions of Signal Processing, vol. 51, No. 10, Oct. 2003, pp. 2511-2526.
"Robust Adaptive Time Delay Estimation for Speaker Localization in Noisy and Reverberant Acoustic Environments", Simon Dolco et al., EURASIP Journal on Applied Signal Processing, Hindawi Publishing Corporation, 2003:11, pp. 1110-1124.
"Robust Speaker Localization Using a Microphone Array", Norbert Strobel et al., Telecommunications Laboratory University of Erlangen-Nuremberg, IEEE X European Signal Processing Conference Eusipco 2000, Tampere, Finland, Sep. 2000.

* cited by examiner

*Primary Examiner* — Daniel D Abebe
(74) *Attorney, Agent, or Firm* — Marks & Clerk; Richard J. Mitchell

(57) ABSTRACT

An active stream is selected from one of a plurality of audio streams generated in a common acoustic environment by obtaining, for each stream obtaining, at a series of measurement instants $t_n$, where n=1 ... N, a final performance metric that is representative of the stream's goodness for representing near-end speech at each measurement instant $t_n$. The final performance metrics for each stream are accumulated to determine an overall performance score. A switch to a new stream as the active stream occurs when the stream with the best overall performance score exceeds the overall performance score of the currently active stream by a threshold amount.

25 Claims, 5 Drawing Sheets

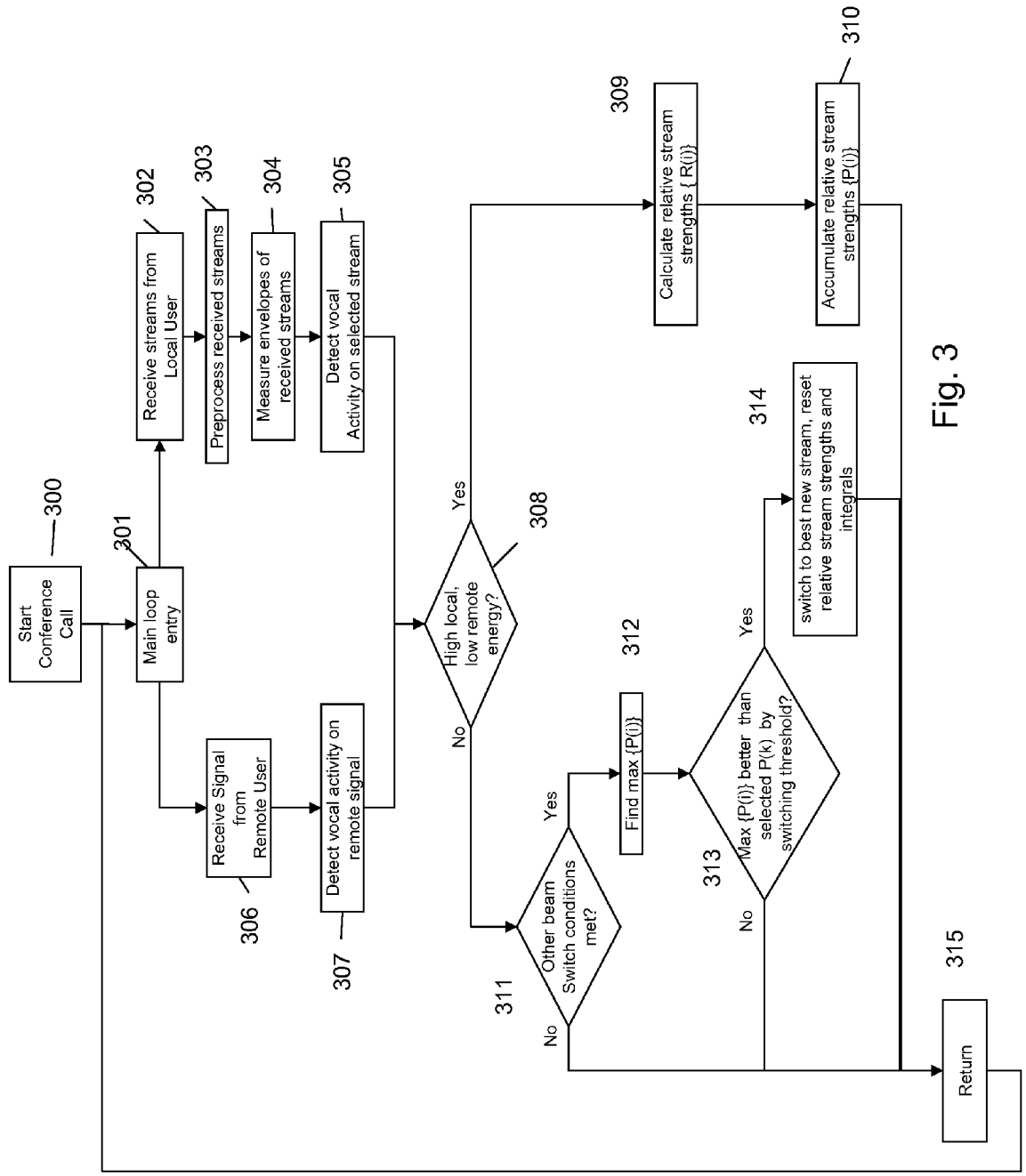

METHOD AND APPARATUS FOR SELECTING AN AUDIO STREAM

FIELD OF THE INVENTION

The present invention relates to the field of audio processing and, more particularly, to a method and apparatus for selecting an audio stream from among several streams carrying near-end audio in a common acoustic environment.

BACKGROUND OF THE INVENTION

An audio conferencing terminal may be used both to pick up audio from, and play audio to, one or more people who are physically distant from, but in the same room as, the terminal. This is in contrast with a telephone handset, in which the microphone and speaker are adjacent to the mouth and ear of a single talker. Some audio conferencing terminals are capable of producing more than one audio stream containing audio from the room in which that terminal resides (commonly known as near-end audio). As an example, the terminal may include or take inputs from several microphones, each of which produces an audio stream. Alternately, it may perform beamforming or other processing on the outputs of several microphones, to produce multiple audio streams representing the streams that would emanate from virtual microphones or speakers at circumferential locations between the actual physical microphones or speakers. In such cases, it is often necessary to select one or more of the available audio streams that best represent near-end speech, for transmission to one or more remote endpoints. To this end, methods for selecting the best audio stream or streams from among several candidates have been developed.

From the viewpoint of the conference user, the best audio stream is that which most faithfully reproduces speech from an active talker (near-end speech). If there is no active talker in range of the conferencing terminal's microphones, the stream selection should remain fixed; in this case the selected stream may be that which was chosen for the previous active talker, or a fixed "no active talker" selection.

Reliable stream selection enhances the performance of the conferencing terminal by ensuring that the near-end audio is as clear as possible. In systems with spatial processing, such as beamforming, the best stream(s) may provide gain to the acoustic signal from an active talker(s), and attenuation to noise and echo signals. Thus reliable stream selection enhances the signal-to-noise and signal-to-echo ratios of the conferencing terminal, thereby improving the quality of the audio stream sent from the terminal.

In many applications, the audio streams entering the stream selection subsystem are known to have highest power for audio signals arriving from known directions. This is the case when the streams are the outputs of a beamformer, which processes the outputs of an array of microphones having a known geometry to produce streams having maximum energy for audio sources from specific directions. See Jacob Benesty, "On microphone array beamforming from a MIMO Acoustic signal processing perspective" IEEE Trans. Audio, Speech, and Language Processing, vol. 15, No. 3, March 2007 p. 1053; and S. Doclo and M. Moonen, "Design of broadband beamformers robust against gain and phase errors in the microphone array characteristics," IEEE Trans. Signal Processing, vol. 51, no. 10, pp. 2511-2526, 2003. A similar situation arises when the streams are the outputs of fixed directional microphones. In such cases, stream selection provides information about the location of a talker, who is on or near a line extending from the audio terminal, in the direction of the maximum response of the selected stream. Such localization information is useful in systems which attempt to reproduce the spatial characteristics of sent audio at the playing end. Thus reliable stream selection is an important component within a conferencing system with spatial audio capabilities.

In systems utilizing fixed-geometry microphone arrays, an alternative to selecting one stream from a set of candidate streams, is to estimate the direction of arrival of the acoustic signal, which in turn allows formation of an optimum single stream. Direction of arrival may be estimated from time-of-arrival, or via beam-sweeping methods.

Alternatively, the localization and beamforming tasks can be combined in a system which uses a single method to both determine direction-of-arrival, and to combine microphone outputs into a single stream maximizing SNR or other performance metric in this direction.

These techniques tend to require greater computing power than systems utilizing a fixed beamformer followed by a stream selection subsystem. For a conferencing terminal in which computational resources are limited by constraints on space, power or cost, the latter type of system is often a better choice than one of the more adaptive localization techniques.

The task of selecting the best audio stream is made more difficult by the presence of acoustic noise sources, and also by the acoustic signal being played from the speakers (e.g., speech and noise from the remote conference participants, also known as far-end audio). For example, if the selection method is selected based on only acoustic signal strength, the stream may be selected which most faithfully reproduces noise or the audio from the external speakers, when these are the loudest noise source in the room. Acoustic echo of near-end audio also makes the stream selection task more difficult—although the correct stream may be selected while a talker is speaking, it may shift to select acoustic echoes of the speech after the person stops talking.

The basic elements of a stream selection subsystem include a metric or measurement of the performance of each stream, methods for comparing streams based on this metric and selecting for the best one(s), and a control entity. These three elements between them generally provide one or more mechanisms for choosing the best stream for representing near-end speech, while preventing switches to streams that best represent other sounds including background noise, acoustic echo from the speakers, or echoes (reverberation) of the near-end speech.

Solutions using a metric based on signal-to-noise ratio (SNR) can fail to track a talker near a noise source, i.e. such solutions can select a stream that does not correspond to a beam pointing at the talker's spatial location, but which nevertheless has a higher SNR. Although in some applications the highest-SNR stream might still be the preferred stream, this does not work for spatial audio. Furthermore spatial processing, such as beamforming, may change frequency response considerably for audio not arriving from the stream's main point directions, with the result that audio from a direction not in line with the main point direction of the selected spatial processing algorithm has an unrealistic filtered sound.

Solutions using a metric based purely on power may be confused by the presence of noise that is louder on one stream than on another. Without proper control logic, a power-based metric can cause the noisy stream to be selected whenever there is not louder speech present. This solution has necessitated the use of control logic that gates stream measurements and/or comparisons by the presence of near-end speech activity.

Selection methods using a level-based threshold ignore information about the relative strengths of different streams over time. A stream with a slight advantage might not exceed the selected stream by the threshold amount, and so may never be selected. This can occur when the signal is weak (as is the case when talkers are far from the audio terminal), or when there is a large overlap between streams in terms of their performances in representing near-end speech. The threshold may be adjusted to select such weakly advantageous streams; however this may result in spurious switches to incorrect streams when the signal is strong.

A similar problem occurs when stream switching is based a time-based threshold. If the time window is chosen to prevent spurious switches (e.g. due to reverberations or noise fluctuations) at a wide range of signal levels, it will be unnecessarily slow to switch when there is a stronger advantage for the new stream over the old (which may occur in the majority of cases).

The use of windowing mechanism described in US2002/001389A1 and U.S. Pat. No. 7,130,797 is one way to circumvent the difficulties described above. This mechanism uses a level-based threshold to arrive at instantaneous best-stream decisions, but then saves these instantaneous decisions in a FIFO. It then processes previous decisions over the length of the FIFO to determine the final best-stream output. However, since the instantaneous decisions use a level-based threshold, these lose information about the degree to which one stream was better than another at any instant. As such, they are vulnerable to reverberations and echoes. In U.S. Pat. No. 7,130,797, this difficulty is addressed by adding a second, short-time best-stream estimate. This "direct path" estimate is used to weight the instantaneous measurements that are used to produce a final best-stream estimate. This modification adds complexity to the overall stream selection subsystem, which translates into increased time and cost to implement the solution.

SUMMARY OF THE INVENTION

An object of the invention is to recognize when there has been a change of, or movement of, the active talker and determine the best audio stream to select in the current situation.

According to the present invention there is provided a method of selecting as an active stream one of a plurality of audio streams generated in a common acoustic environment, comprising for each stream obtaining, at a series of measurement instants $t_n$, where n=1 ... N(t), a final performance metric that is representative of the stream's goodness for representing near-end speech at each measurement instant $t_n$; accumulating the final performance metrics for each stream to determine an overall performance score for each stream; and switching to a new stream as the active stream when the stream with the best overall performance score exceeds the overall performance score of the currently active stream by a threshold amount.

It will be understood that the measurements are accumulated constantly up to N(t), which continues to accumulate until a new stream is better than the old by a threshold amount, when the count is restarted.

In one embodiment a measured performance metric representative of the ability of each said stream to represent speech is obtained at each interval $t_n$, and the final performance metric is a relative value computed by comparing the measured performance metric of each stream with the measured performance metric of the currently active stream.

Embodiments of the present invention have the advantages that they are simple to implement and have low computational complexity, and select the best stream accurately even when the differences between the streams are small, or when there are fluctuations in the instantaneous best stream due to reverberations or echo. Furthermore, the proposed stream selection subsystem can select the best stream more quickly when differences between the streams are larger so stream tracking performance is not limited to that which is achievable in the worst case scenarios.

The present invention describes a relatively simple stream selection method which is effective in selecting the best stream even when those streams originate from an array of microphones having highly overlapping polar patterns. Furthermore existing techniques may be subject to a threshold effect that limits the dynamic range for which stream selection is reliable. The invention is based upon a new method of scoring the goodness of each stream. This scoring is used in conjunction with a control element that ensures the measurement applies to active speech, and a decision element that chooses the best stream based on the stream scores. The resulting decision rule works for a wide variety signal-to-noise ratios and stream sources; it does not require a large difference between streams such as may be achieved with highly directive microphones or beamforming.

According to another aspect of the invention there is provided an audio stream selection apparatus comprising an input device for generating a plurality of audio streams in a common acoustic environment; a measurement unit for measuring the strength of each stream; a processing block configured to compute for each stream, at a series of measurement instants $t_n$, where n=1 ... N, a final performance metric that is representative of the stream's goodness for representing near-end speech at each measurement instant $t_n$ and accumulate the final performance metrics for each stream to determine an overall performance score for each stream; and a switching unit for switching to a new stream as the active stream when the stream with the best overall performance score exceeds the overall performance score of the currently active stream by a threshold amount.

In yet another aspect the invention provides 22. Conference apparatus comprising an array of microphones for picking up speech in a conference room; a preprocessing block for generating a plurality of audio streams from said microphones; a measurement unit for measuring the strength of each stream; a processing block configured to compute for each stream, at a series of measurement instants $t_n$, where n=1 ... N, a final performance metric that is representative of the stream's goodness for representing near-end speech at each measurement instant $t_n$ and accumulate the final performance metrics for each stream to determine an overall performance score for each stream; and a switching unit for switching to a new stream as the active stream when the stream with the best overall performance score exceeds the overall performance score of the currently active stream by a threshold amount.

BRIEF DESCRIPTION OF THE DRAWINGS

The invention will now be described in more detail, by way of example only, with reference to the accompanying drawings, in which:

FIG. 3 is a simplified flow diagram of an embodiment of the invention;

DETAILED DESCRIPTION OF THE INVENTION

Figure 1:
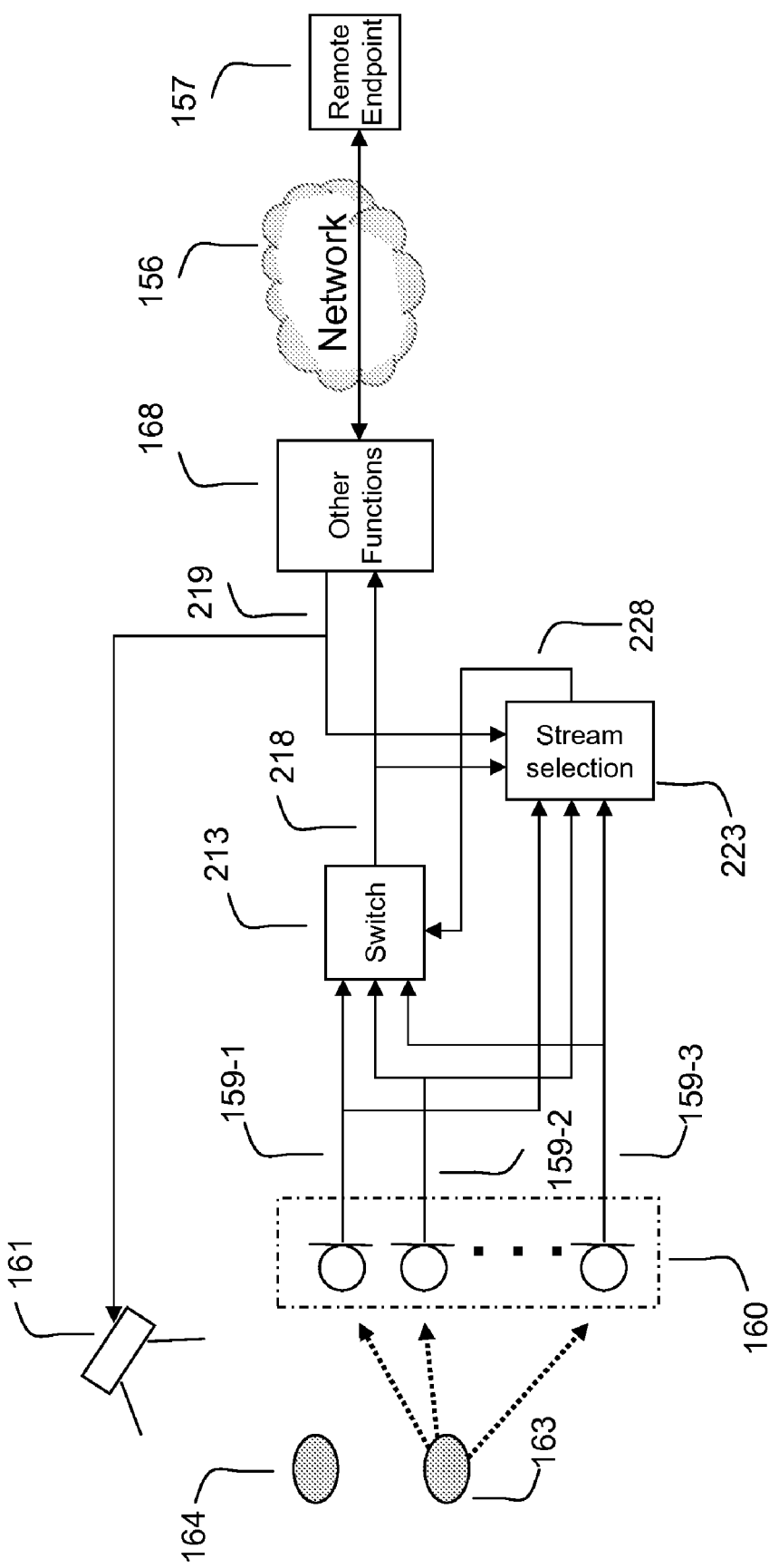
FIG. 1 is a high level block diagram showing the major components of a generic stream selection system.

FIG. 1 illustrates the key components of a typical audio conferencing system deployed in a room including representative people (talkers) 163 and 164. This system is connected via a network 156 (an IP network is preferred) to one or more remote endpoints 157.

A typical system will include one or more loudspeakers 161 and a microphone block 160 consisting of an array of microphones and possibly some pre-processing capability. In a simple system a single loudspeaker is employed. It will be understood that the loudspeaker 161, driven by far end audio signal 219, could be multiple loudspeakers. Signal 219 may contain stereo or other spatial audio signals.

Loudspeakers 161 and microphone array 160 may be physically integrated into a single housing or may be separate physical components connected to common equipment 213, 223 and 168.

Many microphone array configurations are known but common examples include directional microphones within a single housing (e.g. as used in Polycom Soundstation IP 4000) or simply discrete microphones distributed around a conference table, or combination (e.g. IP 4000 with optional extension microphones). Other products employ an array of omnidirectional microphones followed by a beamformer (e.g. in single housing Mitel 5310 IP Conference Unit). It is also know to optionally include Acoustic Echo Cancellation within function 160. For the purposes of this invention the audio source of signals 159 could involve any of these methods.

Common equipment can be grouped into three functions. A Switch 213 selects one of the audio signals 159 resulting in signal 218 being transmitted to the Remote Endpoint 157. A control signal indexSelectedStream 228 determines which Switch input is selected at any point in time.

Stream Selection unit 223 also receives as input the same audio signals 159-1 . . . 159-3 and generates the control signal 228. Both receive-audio 219 and the currently selected transmit-audio 218 signals are used in the stream selection function.

A third box, labeled Other Functions, 168 contains all functions well known in the art including other signal processing e.g. echo canceller(s), the network interface, call setup, volume controls, indicators etc.

For the purposes of understanding the invention the following description assumes there are only three streams. It is further assumed that talker 164 has just finished speaking and that talker 163 has just started to speak. It will be understood that this talker's voice will be picked up by all microphones to some degree (dotted lines). In addition to the voice of the active talker the aggregate sound received at any one microphone includes sound playing from the speaker(s) 161, room echoes and reverberation, and general noise. This description assumes as a starting point that the active sound source is 159-1, i.e. transmit-audio signal 218 is switched to stream 159-1.

Figure 2:
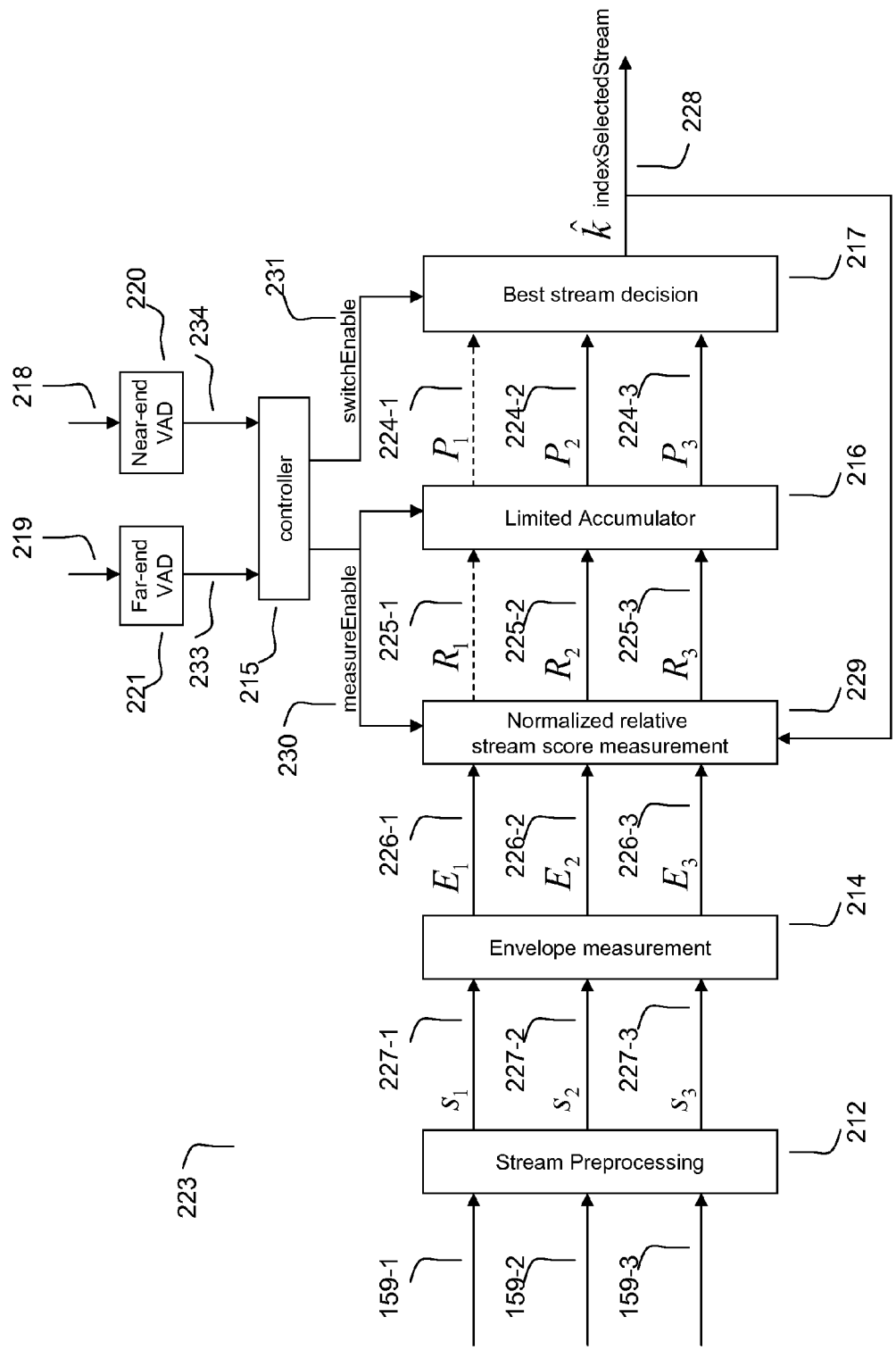
FIG. 2 is a simplified block diagram of one embodiment of the invention for speech stream selection.

The stream selector 223 is shown in greater detail in FIG. 2, which illustrates the case of three streams, although it will be appreciated that there can be any number of such streams without changing the substance of the invention. One of three streams is selectable from an initial state where S1 is currently selected. The array of microphones 160, which may or may not be grouped as a fixed-geometry array, produces audio streams 159-1 . . . 159-3, which may optionally be preprocessed. The optional preprocessing 212 is performed for the purpose of improving stream selection and has no impact on the sound heard at the remote endpoint. This is in contrast to the stream processing which may have taken place in block 160, which affects both the sound heard at the remote endpoint and the effectiveness of the stream selection process. In the described embodiment, the block 212 is a high pass filter with a 1 kHz cut-off frequency to produce the streams 227-1 . . . 227-3 (S1 . . . S3) that are input into the stream selection subsystem proper.

In the preferred embodiment all the functions illustrated in FIG. 2 are implemented in a Floating Point DSP (e.g. Analog Devices SHARC ADSP-21369). This DSP will typically be also used to implement other functions shown in FIG. 1.

The stream selection subsystem, providing stream selector 223, processes the candidate streams to produce a "best stream" index $\hat{k}(t)$ 228. In general terms, this is accomplished by taking instantaneous measurements of the "goodness" of each stream 225 at successive measurement instants, and then further processing these to provide a final performance metric 224-1 . . . 224-3. The performance metrics for all streams are fed into the decision unit 217, which uses them to determine $\hat{k}(t)$.

The subsystem first computes for each stream, an instantaneous metric Rn(t) 225-1 . . . 225-3, where n is the stream index and ranges from 1 to M. This metric is selected to measure performance of the stream at measurement interval t; one choice is described in detail below. Based on the set of measurements that is collected over a period of time since the last stream switch, i.e. {Rn(t), n=1 . . . M, t=t_switch, . . . t_now), an accumulator 216 computes set of final scores {Pn, n=1 . . . numStreams) 224. A simple method of accumulating scores is according to Eq (1):

$$P_n(\text{t\_now}) = \sum_{t\_switch}^{t\_now} R_n(t) \quad (1)$$

where t_switch is the measurement time at which the previous stream switch occurred, and t_now is the most recent measurement time.

In the preferred embodiment, the interval between successive values of t is 1 ms; however the skilled practitioner will recognize that a range of intervals is possible.

The best stream decision block 217 compares the final stream scores 224 for all streams using a simple thresholding operation. When the final stream score for a stream other than the selected stream exceeds that of the selected stream by some threshold amount, the highest-scoring stream becomes the new selected stream. The optimal value of this threshold depends upon the method of calculating Rn(t) as well as on the measurement interval; this is discussed in more detail below.

The process of summing the instantaneous metric values of the streams over an interval (rather than thresholding them individually) preserves information about the degree to which each stream's instantaneous metric is better than that of the chosen stream. Furthermore, the final metric reflects stream performance over an interval of time, which debounces the decision and discourages spurious switches triggered by echoes or noise. The degree of debouncing can be increased by increasing the threshold. These two features work together to mitigate the performance problems encountered by previous systems.

One method of obtaining the instantaneous stream strength metric Rn is to measure the power envelope. Let En(t) 226 be a sample of the power envelope of the nth candidate stream, taken at time t. Envelope measurement techniques are well known in the art and will not be further discussed here.

A measurement is then made of the relative strength of En(t) for each stream, with respect to $E_{\hat{k}(t)}(t)$ where $\hat{k}(t)$ is the index of the current selected stream. We denote this relative strength estimate as Rn(t). In the preferred embodiment, Rn(t) is taken as a ratio:

$$R_n(t) = \frac{E_n(t)}{E_{\hat{k}(t)}(t)} \quad (2)$$

The skilled practitioner will recognize that other relative strength measurements are possible. For example, the log ratio or the linear difference as shown in (3) or (4) below.

$$R_n(t) = \log(E_n(t)) - \log(E_{\hat{k}}(t)) \quad (3)$$

$$R_n(t) = E_n(t) - E_{\hat{k}}(t) \quad (4)$$

The skilled practitioner will further recognize that other choices of the instantaneous metric Rn(t) are possible. Setting Rn(t)=En(t) is one such choice, in which case the summation of Eq (1) becomes equivalent to a simple averaging of the stream power over the interval between stream switches.

In the preferred embodiment, the controller 215 enables updates to the instantaneous scores {Rn(t)} n=1, ..., N, only when there is strong near-end speech (for example, when the near-end speech envelope is above the noise floor by some threshold amount), and no far-end speech. The restriction of measurements to occur during high regions of the near-end speech envelope prevents switches to streams that best represent noise or reverberations. The restriction to measure only when there is no active far-end speech prevents switches to streams that best represent audio being played from speakers (acoustic echo). Various methods of speech activity detection are possible and are well known to practitioners in the field of speech signal processing. One such method is described in Strobel and Rabenstein supra.

A further function of the controller 215 is to prevent measurement of the instantaneous scores {Rn} n=1, ..., N during the trailing end of each burst of speech energy. At these times, there is a greater likelihood that the impinging sound (and therefore the instantaneous stream scores) will be dominated by reverberations. This control enhancement decreases the influence of reverberation on the final stream scores, thereby permitting a lower stream switch threshold and faster tracking of changes in the best stream.

In the preferred embodiment, the envelope ratio (Eq 2) is normalized about 0 by subtracting the envelope ratio for the selected stream (by definition, 1.0). This prevents the cumulative stream score from overflowing in the positive direction when represented in a computer, since once the relative score equals the "advantage threshold," the stream switches.

Optionally, an additional bias term B2 may be subtracted from the relative strength, this has the effect of biasing the scores in favour of the currently selected stream.

Optionally, a bias B1 may be added to the selected stream envelope measurement when calculating relative performance Rn(t); B1>0 has the effect of biasing the scores in favour of the currently selected stream.

With the optional bias terms and the measurement control signal included, the relative strength metric 225 can be calculated as:

$$R_n(t) = \begin{cases} \frac{E_n(t)}{E_{\hat{k}}(t) + B_1} - 1.0 - B_2; & (n \neq \hat{k}) \text{ AND } measureEnable; \\ 0 & (n = \hat{k}) \text{ OR NOT } measureEnable \end{cases} \quad (5)$$

where measureEnable is true when conditions for measurement as described in (0048] and [0049] are met, and false otherwise. In Eq (5), at times t when measurement of {Rn(t)} n=1, ..., N is prohibited according to control decisions described in paragraphs [0047] and [0048] (e.g. when measureEnable is false), we set {Rn(t)=0} n=1, ..., N. This rule is given for consistency with Eq (1), though obviously in practice it is not necessary to add the zeros when computing Eq (1), i.e. updates to Eq (1) are also prohibited when measureEnable is false.

Optionally, the relative strength metric may be further smoothed.

Finally, the accumulated sums of instantaneous stream scores are preferably limited from below. Without such a limit, if the normalized stream scores of Eq (5) are used, a stream's cumulative score may theoretically underflow in a practical implementation. Also without a lower limit, the time taken for the system to switch to a new stream tends on average to increase, the longer the previous stream has been selected. Therefore the final input 224 to the stream selection block 217 is $$P_n(t\_now) = \max\left(\sum_{t\_switch}^{t\_now} R_n(t), lowestStreamScore\right) \quad (6)$$

In the preferred embodiment, the value of lowestStreamScore is −100; in general the best value for this parameter depends upon the amount of acoustic energy found in reverberations, and the size of the measurement interval.

The "Best stream decision" block 217 selects a new best stream as that stream having the highest value of $P_n(t\_now)$, provided that value exceeds the current selected stream's final stream score $P_{\hat{k}}(t\_now)$ (which is always zero in the preferred embodiment) by some threshold amount, which we will call Δ. If the threshold is not exceeded, the selected stream does not change. The use of the threshold Δ prevents rapid stream switches, e.g. on a time scale faster than changes in active talker, which may be caused by acoustic echoes from the near-end speech, or by room noise. In the preferred embodiment, in which the instantaneous metric is described by the normalized relative stream energy of Eq. (5), a beam switch threshold of Δ=40 has been used.

To avoid an audible change in the loudness or quality of the sent audio when the stream switches the control element 215 allows the stream switch to occur only when near-end speech energy is low.

The operation of practical conference unit will now be described with reference to the flow diagram in FIG. 3. At the start of a conference call, step 300, the main loop 301 is entered. The streams received from a local user, block 302, are preprocessed 303 and their envelopes measured 304. The signals are also passed through a voice activity detector 305. The signals received from the remote user 306, are passed to voice activity detector 307. The process then moves to block to determine whether they have high local and low remote energy and the process forks as indicated.

In the left fork, a determination is made as to whether other switch conditions are met, block 311. If yes, block 312 finds the max {P(i)} and decision unit 313 determines whether the Max {P(i) is better than the selected P(k) by the switching threshold. If yes, the system switches to the new best stream, block 314 and returns to the loop, block 315. If no, the system returns directly to the loop.

In the example three audio streams 159 are input to an optional Stream Preprocessing filter 212. This filter adds to any processing done in 160 that is required for the sole purpose of improving the Stream Selection process. For example, in the preferred embodiment a high pass filter (cut-off frequency 1 kHz) is used to process each stream 159. The stream preprocessing function 212 may also, for example, perform beamforming, prefiltering, noise removal, equalization, or some combination of these.

The three audio streams 227 after preprocessing (or 159 if no preprocessing is used) are input to the Envelope Measurement function. Envelope Measurement is well known but in the preferred embodiment the measurement results in a signal 226, representing the audio power of the signal, updated every 1 ms. 226-1 corresponds to audio signal 227-1 and so on.

During active speech, these Envelope Measurement signals are normalized relative to the currently selected stream (226-1 in this example) in 229. Flow chart FIG. 4 further describes the method by which 229 combines 226-2 and 226-1 to produce the Instantaneous Stream Metric 225-2. Similarly 226-3 and 226-1 result in 225-3. It will be clear that 225-1 carries no useful information because it reflects the reference stream; it is shown dotted to illustrate this.

Figure 5:
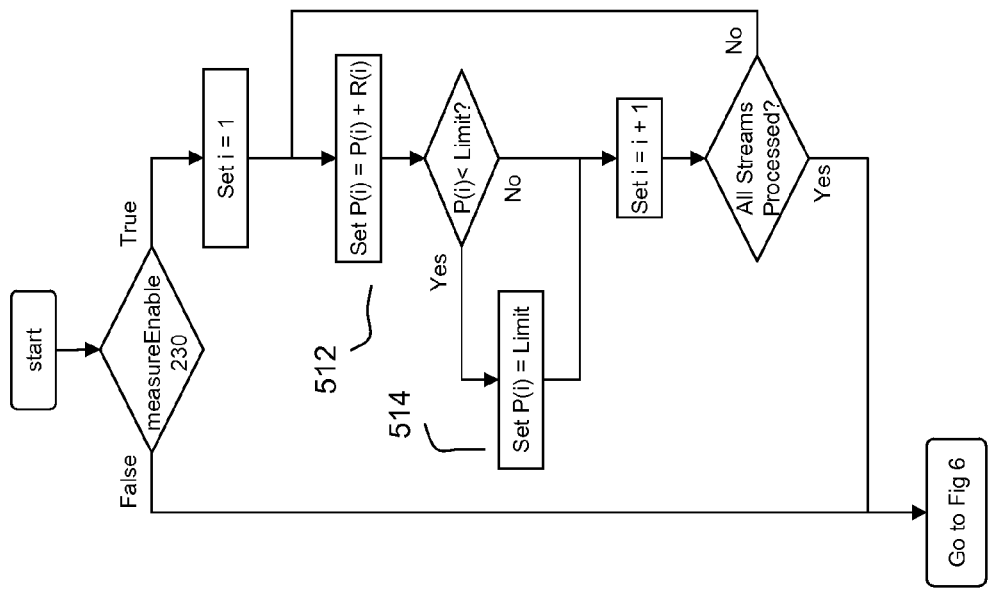
FIG. 5 is a flow diagram of a limit accumulation process implemented in one embodiment of the invention.

Instantaneous Stream Metrics 225 are now accumulated in function 216 as described in the flow chart shown in FIG. 5 resulting in the final Stream metric 224. More specifically 225-2 results in 224-2 and 225-3 results in 224-3.

Figure 6:
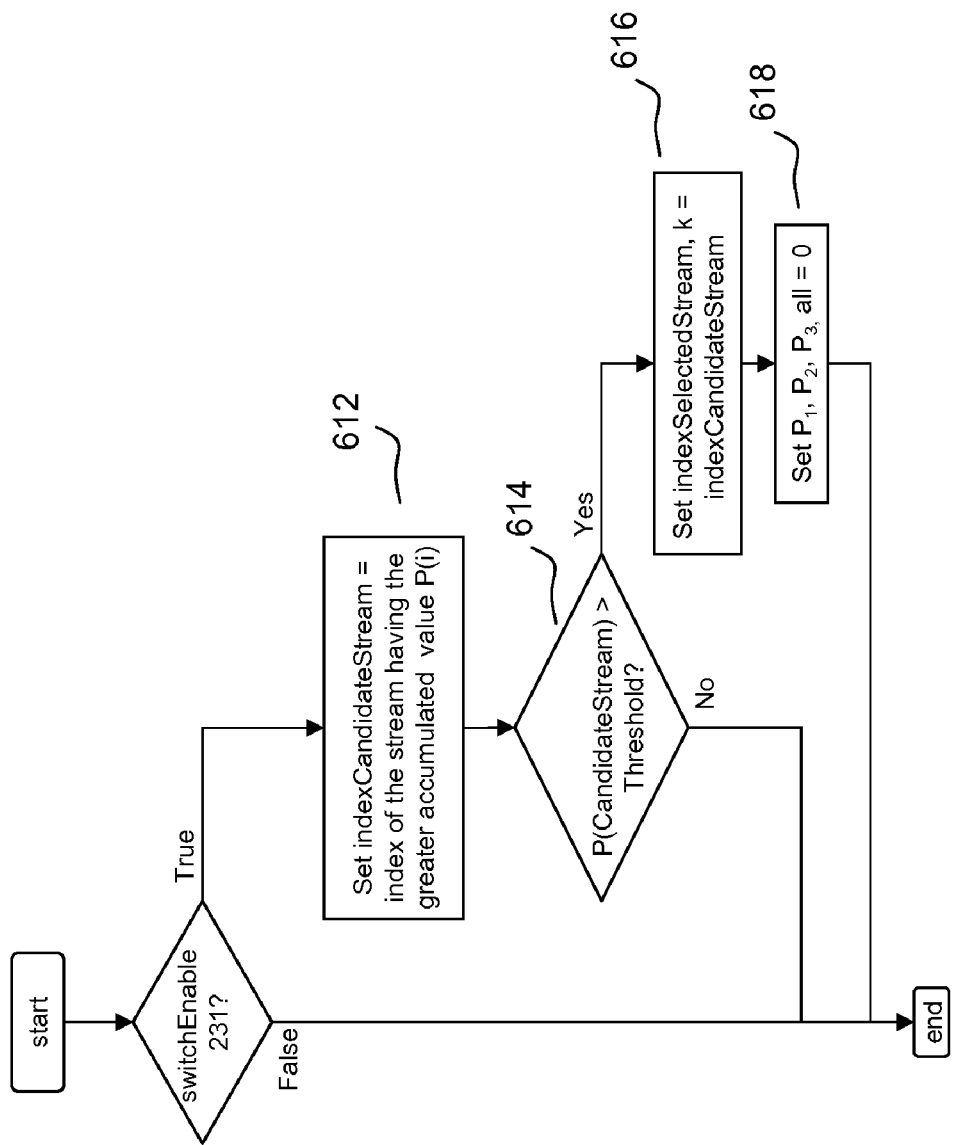
FIG. 6 is a flow diagram of a best stream selection process.

Finally decision logic 217 determines from accumulated stream metrics 224, as shown in Flow chart FIG. 6, which stream best captures the voice of talker 163. In this example it is assumed that this is stream 227-2, and therefore signal 228, representing a stream index, in this example changes from 1 to 2.

Two signals, measureEnable 230 and switchEnable 231, that gate the above functions, are generated in controller 215 from the output of the two voice activity detectors (VADs) 221 and 220. The signal bNearEndSpeech 234 is the output of the near-end VAD 220, which measures the current Near-end audio, i.e. that which is currently selected by switch 213 using index signal 228. It is TRUE when strong near-end speech activity is detected Similarly, signal bFarEndSpeech 233 is the output of far-end VAD 221. It is TRUE when received audio stream 219 contains significant voice activity.

Boolean signal measureEnable 230 is logically equal to {bNearEndSpeech AND NOT bFarEndSpeech}. There may or may not be delay as a consequence of the envelope measurement, but none is deliberately introduced. The smaller the delay the better, but it is not really relevant because it is dwarfed by the switching time. And, bMeasureEnable is NOT delayed with respect to the envelope measurements or any of the downstream measurements. This signal gates the Normalization 229 and Accumulation 216 functions.

Boolean signal switchEnable, 231 is logically equal to {NOT bNearEndSpeech AND NOT bFarEndSpeech} and gates the Best Stream Selection function 217.

Figure 4:
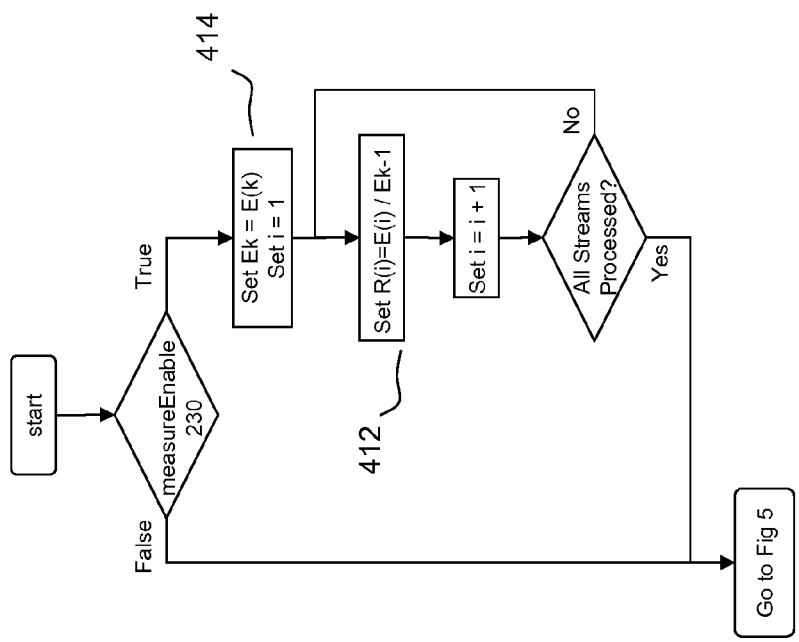
FIG. 4 is a flow diagram of a normalization process implemented in one embodiment of the invention.

It will be understood that the processes of FIGS. 4, 5 and 6 run periodically on a schedule, once every 1 ms in the preferred embodiment. Other processes not central to the invention may also use the same schedule. It will be further understood that at the Start point certain signals persist from the previous execution of the process. These signals, indexCandidateStream 228 and accumulated values 224, like all signals, are values stored in DSP memory.

In the present example the initial value of indexCandidateStream 228 is 1, being the value of the index selecting stream 159-1, the currently selected stream. In all cases immediately after a change in 228 accumulated values 224 will also be initially zero as will be evident from the following. A possible modification is to set the accumulated stream scores P(i) for all streams other than the selected stream to some negative value immediately following a stream switch. This modification would have the effect of adding bias in favour of the current selected stream.

The Normalization process, FIG. 4, runs only when measureEnable 230 is TRUE. It is a simple loop in which the ratio of the Envelope Power for each stream is divided by the Envelope Power of the selected stream, step 412. In the preferred embodiment one is subtracted to facilitate the following processes.

The Accumulation process, FIG. 5 follows. It also only runs when measureEnable is TRUE. It is again a simple loop operating on the result of process 229 for each stream. First normalized Envelope Power is accumulated 512. Then, following a test, the accumulation process is limited to a minimum value (−100 in the preferred embodiment) at step 514. The skilled practitioner will appreciate that the processing shown in FIGS. 4 and 5 could more efficiently be accomplished within a single loop through the available streams. The current presentation has been used to facilitate understanding.

Following Accumulation, the Stream Selection Decision process, see FIG. 6, executes if switchEnable 231 is TRUE. Firstly the accumulated stream values are compared and the index of the stream with the greatest values is stored in indexCandidateStream at 612. Secondly, at 614, the greatest accumulated value is compared with a Threshold. In the preferred embodiment this Threshold value is 40. Thirdly, if the Threshold is exceeded, indexSelectedStream 228 will be changed to value 2 at step 616. Referring back to FIG. 1, this will result in the Switch 213 now connecting stream 159-2 to the transmit-audio stream 218. As a final step in the process accumulated values 224 will be reset to zero.

It will be evident that steps in the above process could be adapted to allow for optional constants B1 and B2 described. Process step 414, FIG. 4, could be changed to "Set Ek=E(k)+B1" and step 412 could be changed to "Set R(i)=E(i)/Ek−1−B2". In the preferred embodiment B1 and B2 are not used, i.e. equal to zero.

It will be appreciated by those skilled in the art that any block diagrams herein represent conceptual views of illustrative circuitry embodying the principles of the invention. For example, a processor may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included.

I claim:

1. A method of selecting as an active stream one of a plurality of audio streams generated in a common acoustic environment, comprising:
for each stream obtaining, at a series of measurement instants $t_n$, where n=1 ... N(t), a final performance metric that is representative of the stream's goodness for representing near-end speech at each measurement instant $t_n$;
accumulating the final performance metrics for each stream to determine an overall performance score for each stream; and
switching to a new stream as the active stream when the stream with the best overall performance score exceeds the overall performance score of the currently active stream by a threshold amount.

2. A method as claimed in claim 1, wherein a measured performance metric representative of the ability of each said stream to represent speech is obtained at each interval $t_n$, and the final performance metric is a relative value computed by comparing the measured performance metric of each stream with the measured performance metric of the currently active stream.

3. A method as claimed in claim 1, wherein a stream switch is restricted to occur only when the near-end speech energy is below a threshold.

4. A method as claimed in claim 2, wherein the final performance metric is the ratio of the measured performance metric of each stream relative to measured performance metric of the currently active stream.

5. A method as claimed in claim 4, wherein the final performance metrics are normalized relative to the final performance metric of the currently active stream.

6. A method as claimed in claim 2, wherein the overall performance scores are reset after each stream switch.

7. A method as claimed in claim 1, wherein overall performance scores are limited from below.

8. A method as claimed in claim 4, wherein the final performance metrics are smoothed.

9. A method as claimed in claim 4, wherein the measured performance metric is the power envelope of each stream.

10. A method as claimed in claim 6, wherein a bias is added to the power envelope to bias the overall performance scores in favour of the currently active stream.

11. Audio stream selection apparatus comprising:
an input device for generating a plurality of audio streams in a common acoustic environment;
a measurement unit for measuring the strength of each stream;
a processing block configured to compute for each stream, at a series of measurement instants $t_n$, where n=1 ... N, a final performance metric that is representative of the stream's goodness for representing near-end speech at each measurement instant $t_n$ and accumulate the final performance metrics for each stream to determine an overall performance score for each stream; and
a switching unit for switching to a new stream as the active stream when the stream with the best overall performance score exceeds the overall performance score of the currently active stream by a threshold amount.

12. Audio stream selection apparatus as claimed in claim 11, further comprising a near-end speech detector for detecting the presence of near-end speech in said acoustic environment, and wherein the overall performance scores are only updated in the presence of near-end speech.

13. Conference apparatus as claimed in claim 12, wherein the processor allows a stream switch only when the near-end speech energy is below a threshold.

14. Audio stream selection apparatus as claimed in claim 12, wherein the processor allows a stream switch only when the near-end speech energy is below a threshold.

15. Audio stream selection apparatus as claimed in claim 12, wherein said measurement unit measures the strength of each stream at each interval $t_n$, and said processor computes the final performance metric by comparing the measured strength metric of each stream with the measured strength of the currently active stream.

16. Audio stream selection apparatus as claimed in claim 15, wherein the final performance metric is the ratio of the measured strength of each stream relative to measured strength of the currently active stream.

17. Audio stream selection apparatus as claimed in claim 16, wherein the final performance metrics are normalized relative to the final performance metric of the currently active stream.

18. Audio stream selection apparatus as claimed in claim 17, wherein the final performance metrics are smoothed.

19. Audio stream selection apparatus as claimed in claim 17, wherein the strength of each stream is defined by the power envelope.

20. Audio stream selection apparatus as claimed in claim 19, wherein the processor adds a bias to the power envelope to bias the overall performance scores in favour of the currently active stream.

21. Audio stream selection apparatus in claim 15, wherein the processor resets the overall performance scores after each stream switch.

22. Audio stream selection apparatus as claimed in claim 11, wherein the processor limits the overall performance from below to prevent an underflow.

23. Conference apparatus comprising:
an array of microphones for picking up speech in a conference room;
a preprocessing block for generating a plurality of audio streams from said microphones;
a measurement unit for measuring the strength of each stream;
a processing block configured to compute for each stream, at a series of measurement instants $t_n$, where n=1 ... N, a final performance metric that is representative of the stream's goodness for representing near-end speech at each measurement instant $t_n$ and accumulate the final performance metrics for each stream to determine an overall performance score for each stream; and
a switching unit for switching to a new stream as the active stream when the stream with the best overall performance score exceeds the overall performance score of the currently active stream by a threshold amount.

24. Conference apparatus as claimed in claim 23, further comprising a near-end speech detector for detecting the presence of near-end speech in said acoustic environment, and wherein the overall performance scores are only updated in the presence of near-end speech.

25. Conference apparatus as claimed in claim 23, wherein said measurement unit measures the strength of each stream at each interval $t_n$, and said processor computes the final performance metric by comparing the measured strength metric of each stream with the measured strength of the currently active stream.

* * * * *